INVENTOR
RICHARD K. BARLTROP
BY
Imirie + Smiley
ATTORNEYS

March 29, 1966  R. K. BARLTROP  3,242,822
PARALLEL REDUNDANT HYDRAULIC ACTUATOR
Filed Dec. 26, 1963  3 Sheets-Sheet 2

INVENTOR
RICHARD K. BARLTROP
BY
ATTORNEYS

March 29, 1966  R. K. BARLTROP  3,242,822
PARALLEL REDUNDANT HYDRAULIC ACTUATOR
Filed Dec. 26, 1963  3 Sheets-Sheet 3

INVENTOR
RICHARD K. BARLTROP
BY
ATTORNEYS

United States Patent Office

3,242,822
Patented Mar. 29, 1966

3,242,822
PARALLEL REDUNDANT HYDRAULIC
ACTUATOR
Richard Kenneth Barltrop, Radlett, England, assignor to
Elliott Brothers (London) Limited, London, England,
a British company
Filed Dec. 26, 1963, Ser. No. 333,371
Claims priority, application Great Britain, Jan. 1, 1963,
61/63
9 Claims. (Cl. 91—173)

This invention relates to a novel form of parallel redundant hydraulic actuator, that is to say, an actuator in which certain portions are duplicated or multiplied, so that if one of the portions fails the actuator as a whole can continue to function without subjecting an aircraft, or other body to which it is fitted, to the risk of disaster.

One major problem which arises in the design of parallel redundant systems is the need to bring the outputs of the various redundant systems together so as to form a single common output. It is necessary in designing such systems to provide arrangements such that the disturbance to the common output resulting from the failure of one redundant system is reduced to an absolute minimum and, in addition, means should be provided to indicate a failure of one of the redundant systems to enable it to be cut out of operation, so that the disturbance caused by its failure may eventually be removed altogether.

The primary object of the invention is to provide a parallel redundant hydraulic actuator which meets these requirements.

The invention consists of a parallel redundant hydraulic actuator comprising a plurality of parallel systems each including a fixed primary double-acting hydraulic cylinder and a movable primary piston therein a secondary double-acting hydraulic cylinder and a movable secondary piston therein, both said secondary cylinder and secondary piston being movable with respect to said fixed primary cylinder, means coupling each primary piston and the respective secondary piston together so that movement of the one affects the force acting on the other, and means coupling all the secondary pistons together to provide a common output.

The secondary cylinder may be formed within the primary piston.

Preferably the coupling between the primary and secondary pistons comprises or acts as a dashpot in such a manner that a disturbance due to the failure of one redundant system is applied to the common output at a limited rate. This is preferably arranged so that a relative movement between the primary and secondary pistons is allowed which is equal to or greater than the normal steady state and dynamic disparities between positions of the members, so that the influence on the common output of the failure of a redundant system is limited to a small value.

There may be means included in the means coupling the primary and secondary pistons together to provide a unidirectional or centre zero force generated either hydraulically, mechanically, magnetically or electrically between the secondary pistons and secondary cylinder to ensure that control of the common output is maintained without lost motion subsequent to a system failure, provided that at least three redundant systems are present.

Certain preferred embodiments of the invention will now be described with reference to the drawings accompanying this specification, in which.

Figure 1:
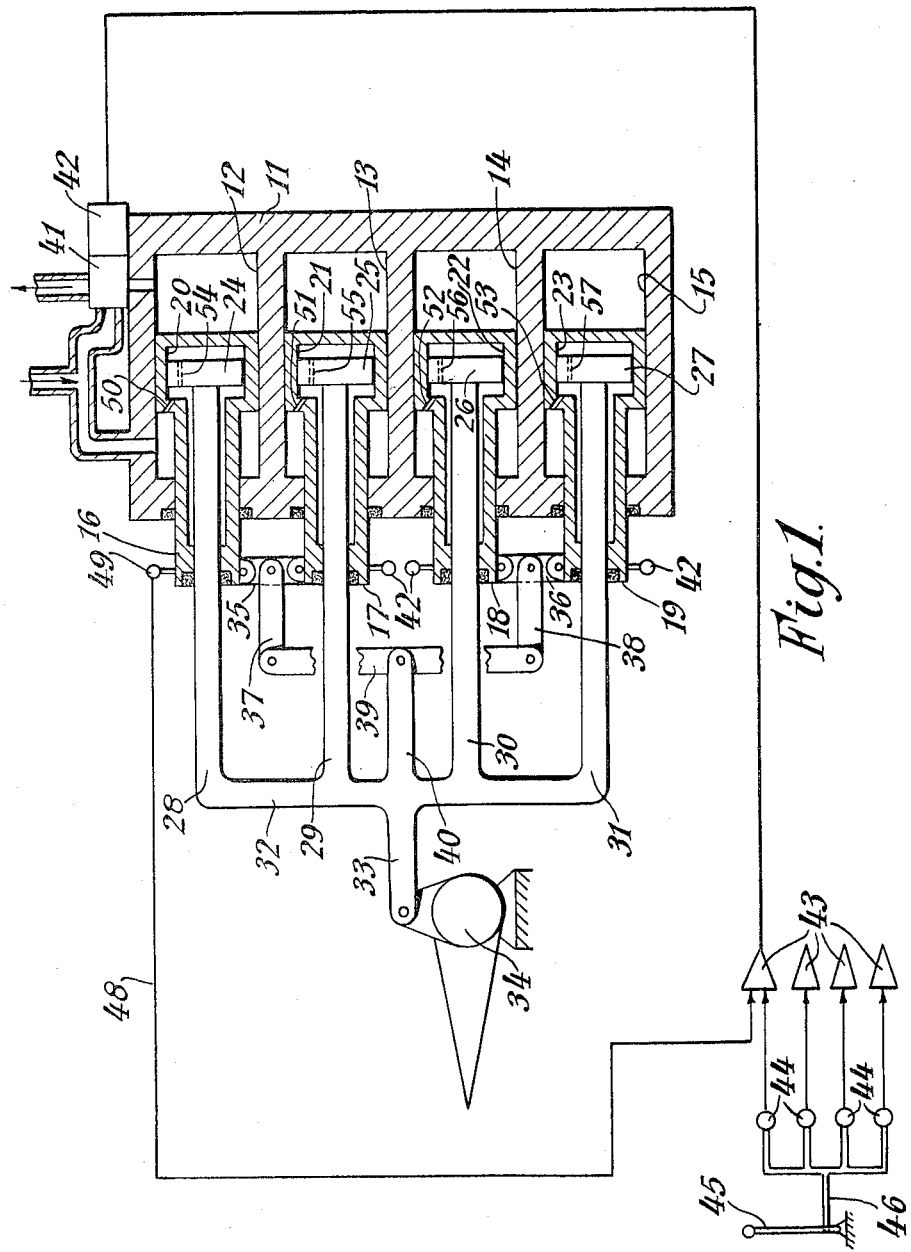
FIGURE 1 shows diagrammatically one embodiment of the invention.

Referring to FIGURE 1, there is shown an actuator including four redundant hydraulic systems which are coupled together by a summing linkage to produce a common output. The actuator comprises a fixed cylinder block 11 containing four primary cylinders, respectively 12, 13, 14 and 15, one for each of the redundant systems. These primary cylinders are double acting, that is to say, hydraulic pressure may be applied to both ends. Each of the cylinders contains a primary piston and piston rod, respectively 16, 17, 18 and 19, the respective piston rod projecting through one end of the cylinder and being sealed against leakage of hydraulic liquid by means of a pressure seal. Each of the primary pistons 16 to 19 is made hollow to form a secondary cylinder, respectively 20, 21, 22 and 23, and each of the secondary cylinders contains a secondary piston, respectively 24, 25, 26 and 27. The secondary pistons each have a piston rod, respectively 28, 29, 30 and 31, which projects through one end of the secondary cylinder, there being a further seal to prevent leakage of liquid along the piston rod. The piston rods 28 to 31 are rigidly connected together through a bar 32 which has a central extension rod 33 coupled to a device 34 which represents the member to be actuated, for example, a control surface of an aircraft. By virtue of the linkage connecting the secondary pistons the force exerted on the central extension rod 33 and applied to the member 34 is the algebraic sum of all the forces exerted on the individual pistons. The primary pistons 16 to 19 are each provided with a lug or other convenient means of coupling, and a bar 35 is pivotally coupled to the pistons 16 and 17, while a bar 36 is pivotally coupled to the pistons 18 and 19. At their centres the two bars 35 and 36 are pivotally coupled respectively by rods 37 and 38 to a bar 39, which at its centre is linked by a rod 40 to the bar 32 and the rod 33. The linkage between the primary pistons and the rod 40 constitutes a displacement summing link, so that the movement applied to the member 34 through the rod 40 is the algebraic sum of the displacements of the primary pistons 16 to 19.

For each primary cylinder a valve 41 is provided together with an electrical actuator 42 to actuate the valve 41. Only one of the valves 41 and actuators 42 is shown. Associated with each of the primary piston rods is an electrical position transducer 49 which provides an electrical signal corresponding to the physical position of the associated piston rod. An amplifier 43 is also provided for each redundant system. The input signal to each of the amplifiers 43 is provided by an associated electrical position transducer 44 and all the transducers 44 are actuated together by a common primary control 45 through mechanical linkage 46. Thus, a common input is applied through the control 45 and this causes an input signal to be applied to each of the amplifiers 43, which in turn provides an output signal over a line 47 to the associated electrical actuator 42 to actuate the valve 41 and thereby vary the input to the respective ends of the associated primary cylinder. The resulting movement of the associated primary piston causes a signal to be generated in the transducer 44 which varies in dependence on the instantaneous position of the primary piston, and this signal is transmitted as a feedback signal over an associated line 48 to the input of the associated amplifier 43, in accordance with established servo practice.

It will be appreciated that in the case of a purely mechanical demand system a mechanical feedback of primary piston position, to back-off the associated demand, may be substituted for the electrical system shown. Furthermore, combinations of electrical and mecahnical demand systems can be integrated provided that the electrical and mechanical demands are substantially similar.

The actuator is arranged so that each primary cylinder is fed at the end through which the respective piston rod projects with hydraulic liquid at a constant pressure, while the pressure acting at the other end of the cylinder is varied by the associated valve 41 in accordance with control commands.

Each secondary cylinder is fed with hydraulic liquid from the constant pressure end of the respective primary cylinder through a restricted passage, respectively 50, 51, 52 and 53, and each secondary piston has a small passage, respectively 54, 55, 56 and 57, passing lengthwise through it to provide communication between the two ends of the secondary cylinder which, as will be remembered, is also the primary piston.

In operation, a constant pressure is applied to the left-hand end of each primary cylinder and the position of the primary piston is varied by varying the hydraulic pressure in the other end of the cylinder. The secondary cylinders have the said constant pressure applied to both ends, by virtue of the passages 54, 55, 56 and 57. The orifices 50, 51, 52 and 53 are convenient for ensuring that the secondary cylinders are kept filled, but play no part in the operation of the actuator. With uniform pressure on both sides of the secondary cylinders the secondary pistons tend to move to the left in FIGURE 1, due to the larger area of the right-hand side of the piston which is exposed to the pressure and, since an equal hydraulic pressure is applied to the end face of the secondary cylinder, there is an equal force tending to move the secondary cylinder (and hence the primary piston) to the right. These forces are both applied to the centre pivot of the bar 39 and the rod 40 and since they act in opposite directions they cancel out, so that relative movement between primary and secondary pistons due to these forces is prevented in normal operation. The magnitude of relevant movement allowed between the primary and secondary pistons is limited either by limiting the length of the secondary cylinder as shown in the figure or by providing stops.

In normal steady-state operation the individual redundant systems individually control the output positions of the respective primary pistons through the demand system comprising the primary control 45, amplifiers 43, transducers 44, the valves 41 and transducers 42. Because of normal small differences between the individual systems, due to the particular combination of tolerances within each individual system, the output positions of the individual primary pistons are likely to be slightly different with respect to the fixed cylinder block 11. Because the primary piston outputs are summed by displacement to the common output, the common output position, that is, the position of the element 34 and, therefore, that of the secondary pistons which are directly connected to the element 34, will be the mean of the output positions of the individual primary pistons. The normal differences which must exist between the positions of the individual primary pistons and their associated secondary pistons are permitted by virtue of the limited displacement dashpots formed by the secondary pistons and their cylinders. So long as the rate of change of disparity between the primary and secondary pistons is low for normal changes in system demands, the common output element will always assume a position corresponding to the mean of the positions of the primary pistons.

Assuming now that a failure has occurred which results in the control valve, i.e., the valve 41, associated with one primary piston being opened. The associated primary piston will attempt to move to the left in FIGURE 1 due to the unbalance in the forces now acting on the two sides of the piston. This will tend to compress the fluid trapped in the associated dashpot and hence transmit these forces through the force-summed secondary pistons to the dashpots of the other three systems which are operating normally. The reaction of the normally-working secondary pistons on their associated primary pistons will immediately oppose the movement brought about by the failure. However, oil is displaced slowly via the orifices in all the dashpots so that the primary piston associated with the failed system is allowed to move slowly to the left until it "bottoms" on its associated secondary piston. Any further movement of the primary piston of the failed system is prevented by the force opposition generated by the three normally-working primary pistons applied through the displacement-summed linkage. The final result of the failure is that the primary piston of the failed system is moved to the left at a slow rate until it is bottomed on its associated secondary piston (or limit stops if such are used) and in so doing it has applied a disturbance to the common output equal to $1/n$ of the relative displacement permitted between the primary and secondary pistons where $n$ is the number of redundant primary pistons. In addition, the rate of application of the disturbance to the common output is $1/n$ of the runaway rate permitted by the dashpot orifices. Accordingly, the effect of the failure is minimized and the rate at which its effect is applied to the system is controlled within a safe limit.

After a failure is diagnosed it may be of advantage to isolate the failed system by by-passing the associated primary cylinder to exhaust in order to remove the disturbance caused by the failed system and ensure that a subsequent failure of another system will also be limited to producing a relatively minor disturbance. If the failed primary cylinder is by-passed to exhaust then the uni-directional forces acting to the left between the remaining secondary pistons and their associated primary pistons will cause the output element to move to the left slowly until one secondary piston bottoms on its primary piston. Once this has occurred the common output is again automatically set to the mean position of the three remaining working primary pistons without backlash.

There are numerous ways in which the actuator may be made to give an indication of a system failure so that steps can be taken to cut out the failed system. One method is to make use of the fact that because under normal working conditions no primary piston will bottom on its associated secondary piston but under system failure conditions one of them must do so, the action of a primary piston bottoming on its associated secondary piston can be made to indicate the failure either electrically or mechanically.

Certain modifications may be made to the actuator illustrated in FIGURE 1, for example, springs may be placed on each side of each secondary piston within the secondary cylinder to tend to maintain each secondary piston centred in the respective secondary cylinder. This may be assisted by providing a second piston rod extending through the opposite end of the primary piston and primary cylinder. Alternatively, a single spring may be incorporated in the end of the cylinder from which the cylinder rod emerges to offset unbalance in the forces acting on the secondary piston due to the differences in effective piston area.

Figure 2:
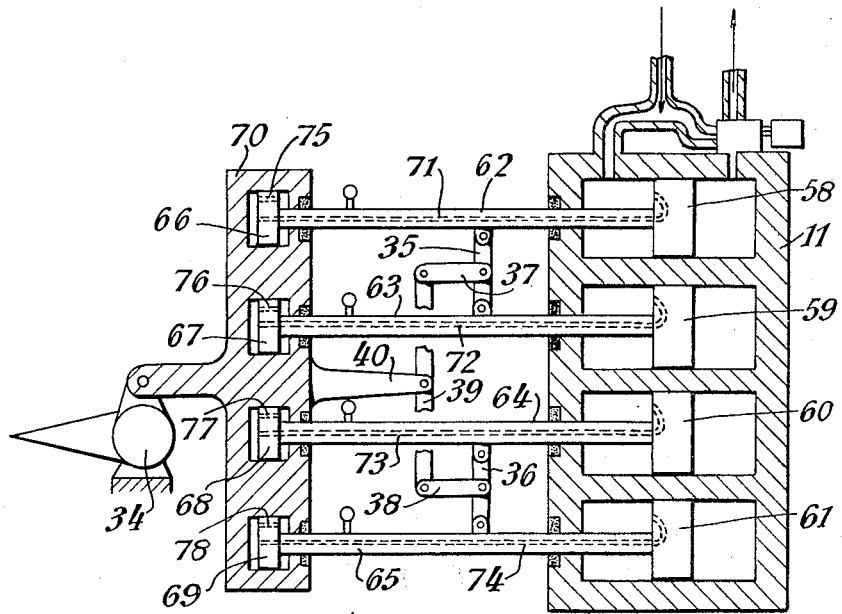
FIGURE 2 shows an alternative embodiment in which a separate cylinder block is used for the secondary cylinders.

Turning now to the embodiment of FIGURE 2, in which like reference numerals are used where applicable, the cylinder block 11 contains four primary pistons 58, 59, 60 and 61 but these are ordinary solid pistons and are connected by piston rods, respectively 62, 63, 64 and 65, to the secondary pistons, respectively 66, 67, 68 and 69 housed in cylinders formed in a separate block 70 which is itself movable and is connected to the element 34. The hydraulic pressure in the constant pressure ends of the respective cylinders is communicated by means of ducts, respectively 71, 72, 73 and 74, to one end of the secondary cylinders and by means of the small passages, respectively 75, 76, 77 and 78, to the other ends of the secondary cylinders. The piston rods of the primary pistons are coupled together through the displacement-summing linkage comprising elements 35, 36, 37, 38 and 39 to the rod 40 attached to the secondary cylinder block 70 and it functions in exactly the same way as the linkage described in relation to FIGURE 1.

The operation of the arrangement of FIGURE 2 is exactly the same as that of FIGURE 1, the difference being merely in the mechanical construction, and it will be clear that the construction of FIGURE 2 may be modified as described in connection with FIGURE 1 by providing a single spring in one end of each secondary cylinder to offset the unbalanced forces acting on the two sides of the secondary piston or by providing a pair of springs which act to centre the secondary piston.

Figure 3:
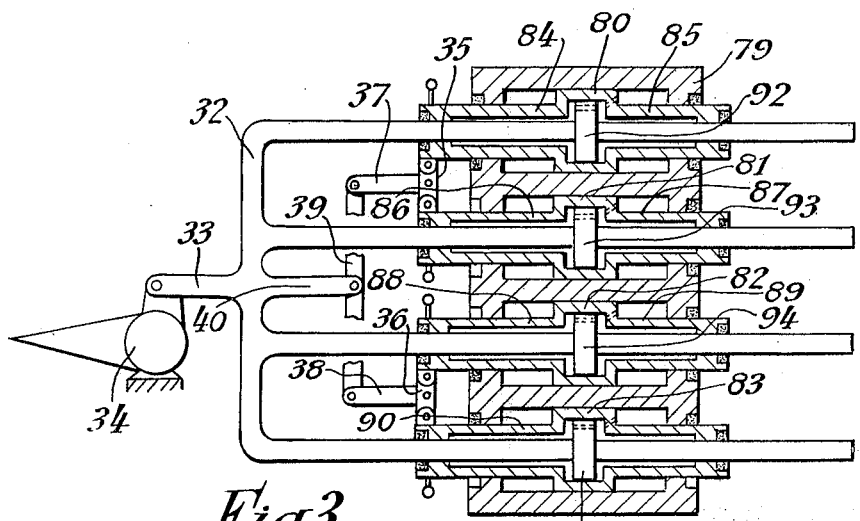
FIGURE 3 shows a third embodiment, similar to that of FIGURE 1 except that each primary and secondary piston has two piston rods projecting through the opposite ends of the associated cylinder.

FIGURE 3 shows an arrangement of the actuator in which differential pistons are not used and the forces acting on the pistons are balanced for given hydraulic pressures by providing each piston with two piston rods projecting respectively through the two ends of the associated cylinder. Thus the primary cylinder block 79 is provided with four cylinder bores in which the respective pistons 80, 81, 82 and 83 are disposed. The piston 80 has two piston rods, respectively 84 and 85, projecting through opposite ends of the respective cylinder, the piston 81 has two piston rods 86 and 87 projecting through opposite ends of the respective cylinder, the piston 82 has two piston rods 88 and 89 projecting through opposite ends of the respective cylinder and the piston 83 has two piston rods 90 and 91 projecting respectively through opposite ends of the respective cylinder. In the same way the secondary piston 92 is provided with two piston rods which project respectively through the two ends of the primary piston rods 84 and 85, the piston 93 is provided with two piston rods which project through opposite ends of the primary piston rods 86 and 87, the piston 94 is provided with two piston rods which respectively project through the ends of the primary piston rods 88 and 89, while the secondary piston 95 is provided with two piston rods which project respectively through the ends of the primary piston rods 90 and 91. The piston rods associated with the secondary pistons are coupled together through the structure comprising the bar 32 and the rod 33 to the element 34, while the primary piston rods 84, 86, 88 and 90 are coupled through the force-summing linkage consisting of elements 35, 36, 37, 38 and 39 to the rod 40 connected to the bar 32 as in FIGURE 1. As in the case of FIGURE 1 a pair of springs may be provided on opposite sides of each of the secondary pistons to apply a centering force to the pistons within their respective cylinders, or a single spring may be provided at one end of each cylinder.

Figure 4:
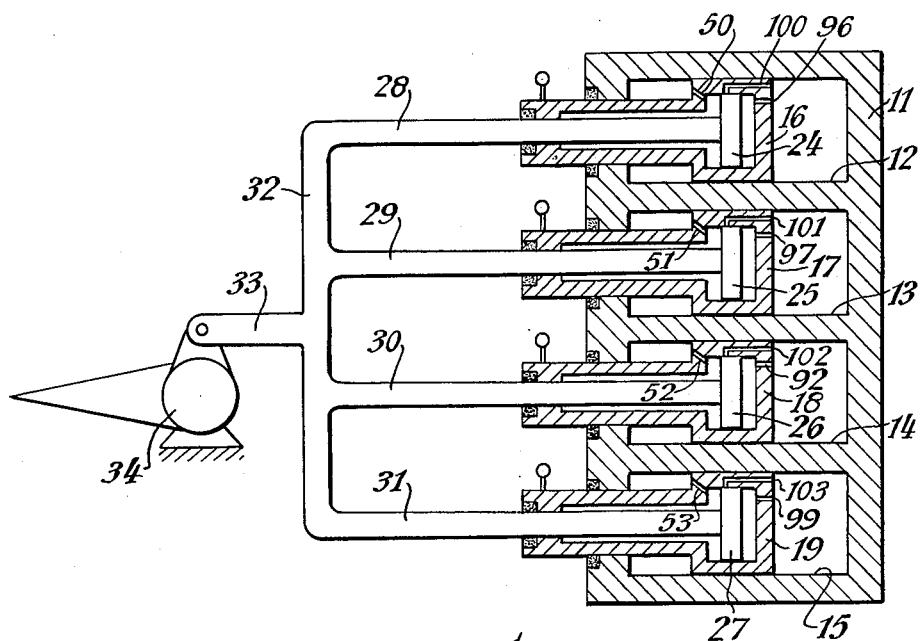
FIGURE 4 shows a further alternative to FIGURE 1 in which the mechanical coupling between the primary pistons is replaced by a hydraulic coupling.

FIGURE 4 shows a variation of the arrangement of FIGURE 1 which eliminates the need for the displacement-summed linkage of the primary pistons. The cylinder block 11 is provided as before, containing the four cylinders 12, 13, 14 and 15 and the arrangement of the four primary pistons and piston rods 16, 17, 18 and 19 containing the secondary pistons, respectively 24, 25, 26 and 27, having piston rods, respectively 28, 29, 30 and 31, coupled together by a bar 32 and connected by a rod 33 to the element 34, are all as described and shown in FIGURE 1. The displacement-summed linkage consisting of elements 35, 36, 37, 38, 39 and 40 is, however, omitted. The primary pistons are each provided with a small passage, respectively 50, 51, 52 and 53, as before, but in addition the primary pistons are each provided with a further passage, respectively 96, 97, 98 and 99 leading from the right-hand end of the respective primary cylinder to the adjacent end of the respective secondary cylinders but the small passages 54, 55, 56 and 57 of FIGURE 1 are omitted. Accordingly, the pressures acting on the two sides of the respective secondary pistons are no longer balanced but are the same as the pressures acting on the corresponding sides of the primary pistons. A further passage is provided in each primary cylinder, respectively 100, 101, 102 and 103 leading from the right-hand end of the respective primary cylinder to a port part-way along the length of the respective secondary cylinder.

It will be remembered that the pressure acting on the left-hand or smaller area sides of the primary pistons in FIGURE 1 was a constant pressure; this is the case also in FIGURE 4 and this constant pressure also acts on the smaller area sides of the secondary pistons. By means of the orifices 96, 97, 98 and 99 variable pressure acting on the larger area sides of the primary pistons is also applied to the larger area sides of the secondary pistons. The passages 100, 101, 102 and 103 allow the constant pressures acting on the smaller-area sides of the secondary pistons to be communicated also to the larger-area sides of the secondary pistons provided that the primary pistons move to the left in FIGURE 4 sufficiently to open the passages. With this arrangement each secondary piston is given a centre-zeroing characteristic with respect to its associated primary piston. In order to explain this it will be assumed that one primary piston is caused to move to the left in FIGURE 4 with respect to its secondary piston. Constant pressure hydraulic liquid then passes through the respective orifice 50, 51, 52 or 53 and through the respective orifice 100, 101, 102 or 103 to the larger-area side of that primary piston. The pressures applied to the two sides of the secondary piston therefore tend to become equal and hence a force is generated which tends to move the secondary piston to the left. When the secondary piston is allowed to move it follows the primary piston until the respective port in the orifice 100, 101, 102 or 103 is partially closed by the secondary piston and a condition of force equilibrium on the secondary piston is then established.

In normal operation each primary piston is controlled to satisfy a demand placed on the associated system as explained previously. Because of the slight differences between the systems previously referred to each primary piston is set in a slightly different output position with respect to the primary cylinder block. The secondary pistons are force-summed to derive the common output and the disparities which exist between the individual primary pistons and their associated secondary pistons are permitted by virtue of the limited displacement dashpots formed by the secondary pistons and cylinders. However, because of the centre-zeroing characteristic described above the common output will be controlled to approximately the mean of the individual primary piston displacements.

Assuming that a failure has occurred which results in the control valve of one primary cylinder being opened, the respective primary piston will attempt to move to the left, due to the force unbalance thereon. This force will tend to compress fluid in the associated secondary cylinder or dashpot and hence this force is transmitted through the force-summed secondary pistons to the secondary cylinders or dashpots of the three systems which are operating normally. The reactions of the normally-operating secondary pistons on the associated primary pistons will cause the primary pistons immediately to oppose the movement resulting from the failure. However, hydraulic liquid is displaced slowly through the orifices 50, 51, 52 and 53, through the orifices 96, 97, 98 and 99 and through the orifices 100, 101, 102 and 103 in the dashpot associated with the failed system so that the primary piston in the failed system is allowed to move slowly to the left. Significant movement of the secondary pistons is prevented by the centre-zeroing characteristic of the normally-working secondary pistons in their secondary cylinders. Eventually, the failed primary piston will bottom on its associated secondary piston (or stops, if provided) so that the reaction forces generated by the three working secondary pistons is greater than that which the primary piston of the failed system can generate and no significant disturbance to the common output position will have taken place. Control of the common output position is retained by the three normally-working systems.

The failure of the one system may be indicated, as explained in connection with FIGURE 1, and steps may be taken to cut it out of operation as also explained earlier.

It will be understood that embodiments other than those described and illustrated, or modifications thereof, may be devised within the scope of the invention as defined in the appended claims.

I claim:

1. A parallel redundant hydraulic actuator comprising a plurality of parallel systems each including a fixed primary double-acting hydraulic cylinder and a movable primary piston therein, a secondary double-acting hydraulic cylinder and a movable secondary piston therein, both said secondary cylinder and secondary piston being movable with respect to said fixed primary cylinder, means coupling each primary piston and the respective secondary piston together so that movement of the one affects the force acting on the other, and means coupling all said secondary pistons together to provide a common output.

2. An actuator as claimed in claim 1 in which said secondary cylinder of each parallel system is formed within the associated primary cylinder.

3. An actuator as claimed in claim 1 in which the coupling between said primary and secondary pistons comprises or acts as a dashpot whereby a disturbance due to the failure of one redundant system is applied to the output at a limited rate.

4. An actuator as claimed in claim 3 in which said dashpot is arranged so that a relative movement between said primary and secondary pistons is allowed which is at least equal to the normal steady-state and dynamic disparities between the positions of said pistons, so that the influence on the common output of the failure of a redundant system is limited to a small value.

5. An actuator as claimed in claim 1 in which the coupling means coupling said primary and secondary pistons together includes means to provide a unidirectional or centre zero force generated between said secondary pistons and secondary cylinders to ensure that control of the common output is maintained without lost motion subsequent to a system failure, provided that at least three redundant systems are present.

6. An actuator as claimed in claim 1 comprising for each system a control valve for the primary cylinder, an electrical actuator to actuate said valve, an electrical position transducer to provide an electrical signal corresponding to the position of said primary piston, an amplifier, a primary control, and a second electrical position transducer to provide a signal corresponding to the position of a primary control, the signals from said two transducers being fed to the amplifier input, said amplifier output being connected to said control valve.

7. An actuator as claimed in claim 6 comprising means to feed one end of each primary cylinder with fluid at constant pressure, the other end of each primary cylinder being fed with fluid at a pressure determined by the position of the associated control valve, each secondary cylinder being fed with fluid from the constant pressure end of the associated primary cylinder through a restricted passage, each secondary piston having a restricted passage to provide communication between the two ends of the associated secondary cylinder, said restricted passages providing the effect of a dashpot.

8. An actuator as claimed in claim 1 in which each primary piston has piston rods respectively projecting through the two ends of the associated primary cylinder, and each secondary piston has two piston rods respectively projecting through the two ends of the associated secondary cylinder, to balance the hydraulic forces acting on the two sides of each piston.

9. An actuator as claimed in claim 1 comprising a displacement summing linkage between all the primary pistons, the said summing linkage being coupled to the means coupling all the secondary pistons together.

References Cited by the Examiner

UNITED STATES PATENTS

| 2,826,896 | 3/1958 | Glaze et al. | 91—363 |
| 3,027,878 | 4/1962 | Keyt et al. | 91—363 |
| 3,070,071 | 12/1962 | Cooper | 91—363 |
| 3,095,783 | 7/1963 | Flindt | 91—363 |
| 3,124,041 | 3/1964 | McMurtry et al. | 91—363 |

SAMUEL LEVINE, *Primary Examiner.*

P. E. MASLOUSKY, *Assistant Examiner.*